(12) United States Patent
Dann et al.

(10) Patent No.: US 9,011,213 B2
(45) Date of Patent: Apr. 21, 2015

(54) FISH TRANSPORTING DEVICE FOR AUTOMATICALLY FEEDING FISH TO A FISH PROCESSING MACHINE AND DEVICE FOR ALIGNING FISH IN A HEAD/TAIL ORIENTATION HAVING SUCH A FISH TRANSPORTING DEVICE

(75) Inventors: Andreas Dann, Lubeck (DE); Jorg Holtz, Lubeck (DE)

(73) Assignee: Nordischer Maschinenbau Rud. Baader GmbH + Co. KG, Lubeck (DE)

( * ) Notice: Subject to any disclaimer, the term of this patent is extended or adjusted under 35 U.S.C. 154(b) by 519 days.

(21) Appl. No.: 13/143,892

(22) PCT Filed: Jun. 24, 2010

(86) PCT No.: PCT/EP2010/003791
§ 371 (c)(1),
(2), (4) Date: Jul. 8, 2011

(87) PCT Pub. No.: WO2011/000496
PCT Pub. Date: Jan. 6, 2011

(65) Prior Publication Data
US 2011/0275299 A1    Nov. 10, 2011

(30) Foreign Application Priority Data
Jun. 30, 2009    (DE) .......................... 10 2009 031 580

(51) Int. Cl.
*A22C 25/08*    (2006.01)
*A22C 25/12*    (2006.01)

(52) U.S. Cl.
CPC .................................... *A22C 25/12* (2013.01)

(58) Field of Classification Search
USPC ........................................ 452/177, 179–184
See application file for complete search history.

(56) References Cited

U.S. PATENT DOCUMENTS

| 2,173,336 A | * | 9/1939 | Lamere et al. ................. 452/127 |
| 4,219,906 A | * | 9/1980 | Crossland et al. ............. 452/140 |
| 4,219,907 A | * | 9/1980 | Fuller ............................... 452/139 |
| 4,399,588 A | * | 8/1983 | Molnar .......................... 452/179 |
| 4,532,677 A | * | 8/1985 | Wenstrom et al. ............. 452/19 |
| 4,951,356 A | * | 8/1990 | Delplanque .................... 452/14 |

(Continued)

FOREIGN PATENT DOCUMENTS

| BE | 656421 A | 3/1965 |
| CA | 2172922 | 2/2000 |

(Continued)

OTHER PUBLICATIONS

European Patent Office, International Search Report and Written Opinion Office in PCT/EP2010/003791, dated Dec. 7, 2010.

(Continued)

*Primary Examiner* — David Parsley
(74) *Attorney, Agent, or Firm* — Sunstone IP

(57) ABSTRACT

The invention concerns a fish transporting apparatus for automatically feeding fish to a fish processing machine. The fish transporting apparatus can include a transport device with a bottom element for receiving the fish and lateral boundary elements for guiding the fish as well as a vibrating member for vibratory driving of the transport device, which is distinguished in that the bottom element is constructed as a grid plate with rectangular apertures. Furthermore, the invention concerns a device for aligning fish in a head/tail orientation with such a fish transporting apparatus.

16 Claims, 4 Drawing Sheets

(56) References Cited

U.S. PATENT DOCUMENTS 5,779,531 A * 7/1998 Braeger et al. ............... 452/127
5,839,952 A * 11/1998 Pollingue .......................... 452/8

FOREIGN PATENT DOCUMENTS

| DE | 19511489 A1 | 10/1996 |
| DE | 10 2009 031 580 B3 | 1/2011 |
| WO | 2011000496 A1 | 1/2011 |

OTHER PUBLICATIONS

German Patent Office, Office Action in DE 10 2009 031 580.2, dated Mar. 1, 2002.

German Patent Office, Grant Decision in DE 10 2009 031 580.2, dated Sep. 13, 2010.

* cited by examiner

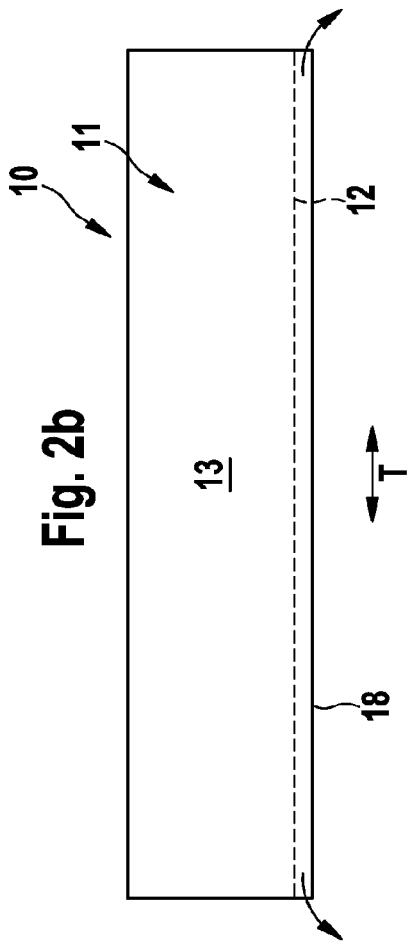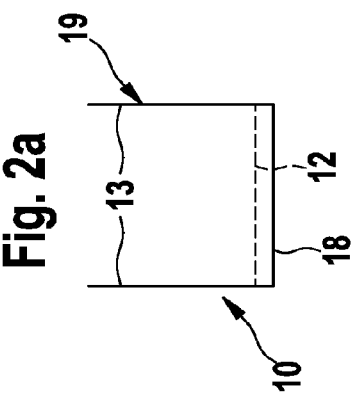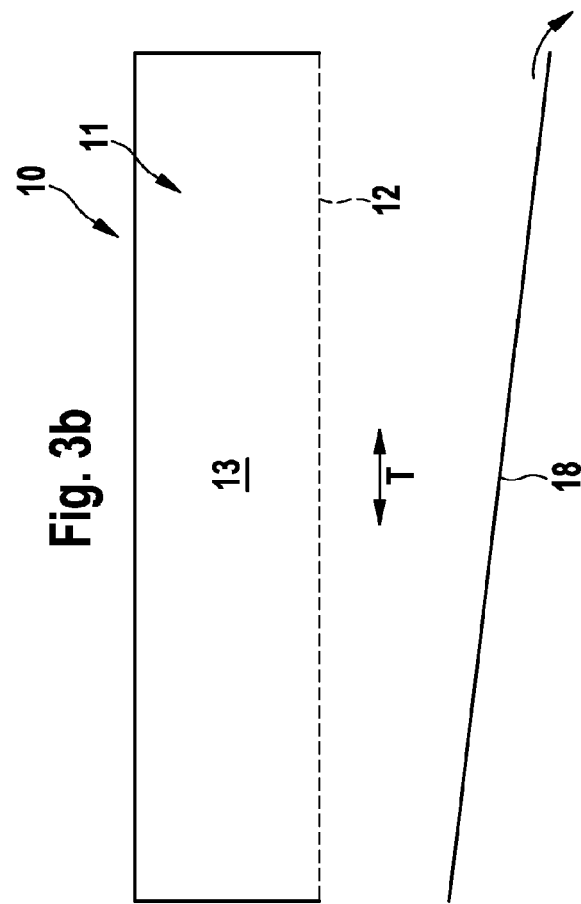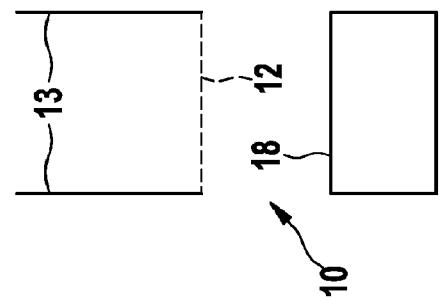

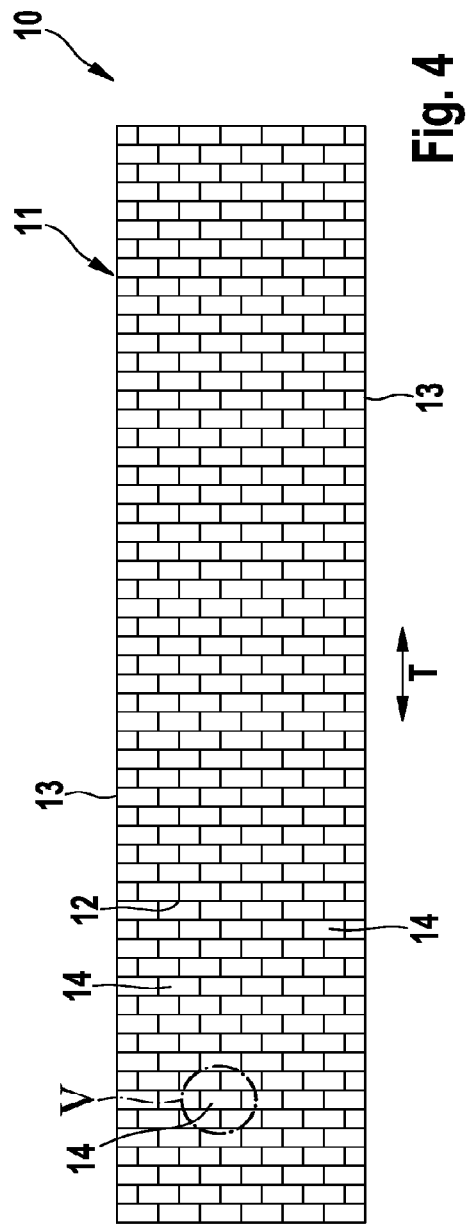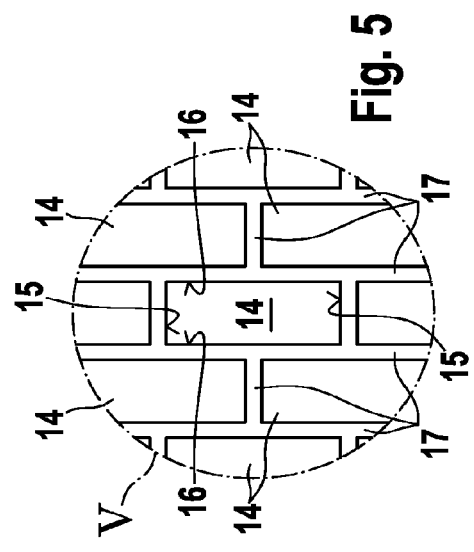

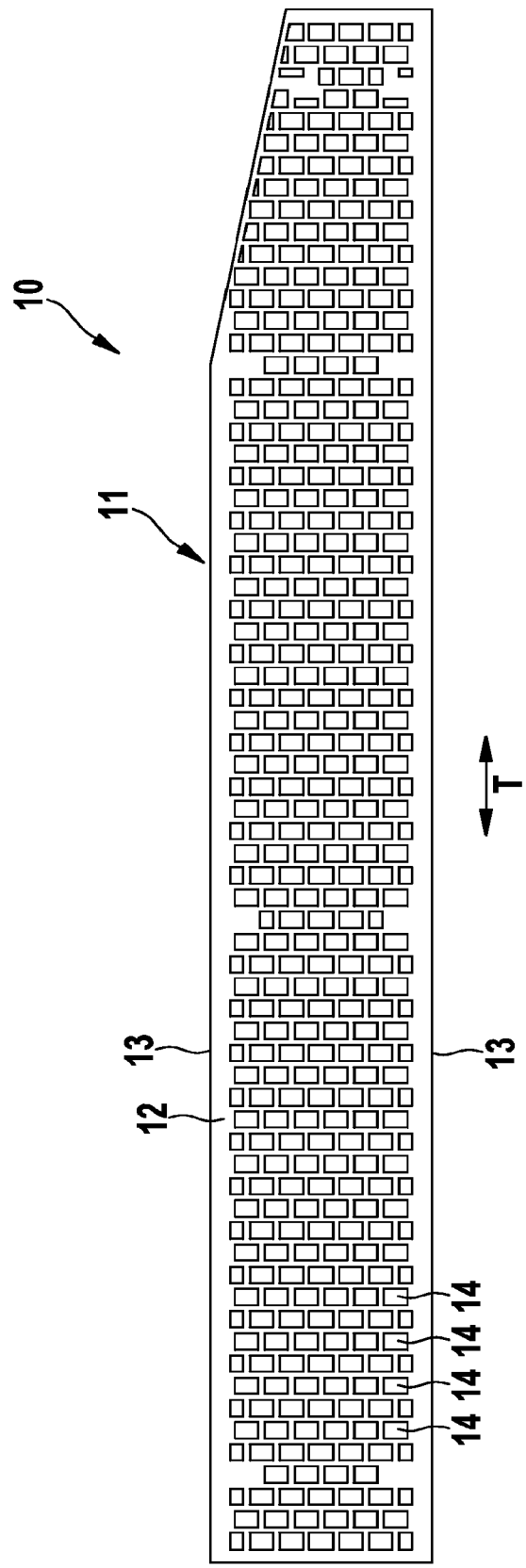

FISH TRANSPORTING DEVICE FOR AUTOMATICALLY FEEDING FISH TO A FISH PROCESSING MACHINE AND DEVICE FOR ALIGNING FISH IN A HEAD/TAIL ORIENTATION HAVING SUCH A FISH TRANSPORTING DEVICE

CROSS REFERENCE TO RELATED APPLICATIONS

This application is a U.S. National stage application of PCT Application No. PCT/EP2010/003791, filed on Jun. 24,2010, which claims the benefit of Gereman Patent Application No. DE 10 2009 031 580.2, filed on Jun. 30 2009. The contents of each of the aforementioned patent applications are incorporated herein by reference in their entirety.

FIELD OF THE INVENTION

The invention concerns a fish transporting apparatus for automatically feeding fish to a fish processing machine, comprising a transport device with a bottom element for receiving the fish and lateral boundary elements for guiding the fish as well as a vibrating member for vibratory driving of the transport device. Furthermore, the invention concerns a device for aligning fish in a head/tail orientation, comprising a fish transporting apparatus (10) and a device arranged at one end of the fish transporting apparatus (10) for turning the fish with respect to their position of head/tail orientation.

BACKGROUND AND RELEVANT ART

Fish transporting apparatuses of this kind, also known as oscillating or vibrating conveyors, are used in the fish processing industry to transport fish in a desired direction, for example towards a fish processing machine. Owing to their structure and surface properties, fish have a preferred transport movement which depends on different factors and/or parameters. In the fish, the scale structure, the presence of fins (tail, ventral, dorsal and pectoral fins), the gill covers and/or other properties such as e.g. the weight and geometric properties are such factors or parameters. These factors or parameters are used to transport the fish in a desired direction, by e.g. using the force of gravity or the rough scale structure of the fish as a drive (impulse). By the example of the scale structure, transport is effected by the scales so to speak "catching" on a rough surface of the transport device. Due to the oscillating or vibrating movement of the transport device, the fish with their scale structure are repelled on the rough surface, which leads to the headfirst transport movement. The preferred transport movement of the fish is therefore not only in relation to the scale structure headfirst.

Corresponding devices for aligning the fish in a head/tail orientation have a fish transport device of this kind. The fish, which are already aligned with the fish processing machine headfirst in the preferred transport movement (direction of transport), are transported headfirst by the oscillation/vibration in the direction of the fish processing machine which is provided there. The fish with a tail-first orientation in the direction of the fish processing machine are transported by oscillation/vibration in the opposite direction away from the fish processing machine in the direction of a turning device, turned through 180° in the turning device in such a way that, after turning, the fish lie on the fish transporting apparatus with their heads in the direction of the fish processing machine, and then delivered to the fish processing machine.

From DE 195 11 489 A1 is known a fish transporting device for automatically feeding fish to a fish processing machine according to the preamble of claim 1.

It is also known from practical experience that ordinary oscillating or vibrating conveyors or the like can be provided with a surface structure which assists transport of the fish in the preferred direction. In this case the closed surface of the bottom element can be provided e.g. with grooves, furrows or the like cut transversely to the direction of transport, which assist transport of the fish. In further fish transporting devices used in practice, e.g. conventional sandpaper is applied to the surface of the bottom element, in order to assist the possibility of the fish "catching" on the bottom element. But transport of the fish is made difficult by the fact that the fish are usually wet and have a slimy layer or coating on the outside. As a result, rubbing and/or "catching" of the fish on the surface structure of the bottom element is made difficult. This concerns in particular fish of the trout species, but also salmon and other species. The known fish transporting apparatuses, however, have several drawbacks. Firstly, the speed of transport is limited on account of the fish properties on the one hand and the surface structure of the bottom element on the other hand. Furthermore, the surface structure of the bottom element is only suitable for transporting fish of a smaller size. Secondly, such fish transporting apparatuses can be cleaned only with difficulty. To put it another way, the known fish transporting apparatuses do not meet the hygiene requirements required in the food industry, because the water and/or slime stays on the bottom element and can be removed only by additional flushing. Moreover, so-called "dirt traps" in which remains of the fish lodge are formed by the grooves, furrows or the sandpaper, which can lead to contamination of subsequent fish.

BRIEF SUMMARY OF THE INVENTION

It is therefore the object of the invention to provide a simple and reliable apparatus for transporting fish of any size, which meets the necessary hygiene requirements. Furthermore, it is the object of the present invention to propose a device for aligning fish in a head/tail orientation with a corresponding fish transporting apparatus.

This object is achieved by a fish transporting apparatus of the kind mentioned hereinbefore by the fact that the bottom element is constructed as a grid plate with rectangular apertures. By this means, a fish transporting apparatus which on the one hand ensures reliable transport of all fish or fish categories and on the other hand is particularly maintenance- and cleaning-friendly, is provided in a surprisingly simple and reliable manner. Due to the design of the bottom element according to the invention, transport is made easier and at the same time the water or the slime which comes away from the fish is carried away by the bottom element. The rectangular apertures enable in particular fins to catch, so that strong drive impulses can be applied to the fish. Hence even the transport of large or heavy fish is made possible. Due to the permeable profile of the grid plate, the slime can flow away, so that the transport surface is free from slime. By this means the production conditions can be kept constant for a longer production period. Furthermore, flushing of the transport surface can be omitted, reducing water consumption.

An appropriate development of the invention is distinguished in that the rectangular apertures are arranged with their edges in the direction of transport T of the fish and at a right angle to the direction of transport T. As a result the edges, in particular the edges which are arranged or oriented at a right angle to the direction of transport T, act directly in the direction of transport T, so that the transport movement is optimally assisted.

Advantageously, the apertures are arranged in a uniform pattern in the bottom element. The distribution, namely in particular the number of apertures and the distances between them, as well as the size of the apertures for forming the pattern, are selected in such a way that, in conjunction with the drive, that is, in particular the o frequency, optimum transport of the fish is ensured.

A preferred embodiment of the invention is characterised in that beneath the grid plate is arranged a guide element for receiving and carrying away the fluid and/or solid constituents which fall through the apertures of the grid plate. The slime and the other constituents flowing or dripping through the grid plate are caught by the guide element and can thus be carried away in a directed and defined manner.

The object is also achieved by a device mentioned hereinbefore for aligning fish in a head/tail orientation by the fact that the fish transporting apparatus is constructed according to any one of claims 1 to 15. The resulting advantages have already been described in connection with the fish transporting apparatus, on account of which reference is made to the corresponding passages to avoid repetition.

BRIEF DESCRIPTION OF THE DRAWINGS

Further appropriate and/or advantageous characteristics and developments of the invention are apparent from the subsidiary claims and the description. A particularly preferred embodiment of the invention is described in more detail with the aid of the attached drawings. The drawings show:

DETAILED DESCRIPTION OF THE PERFERRED EMBODIMENTS

Figure 1:
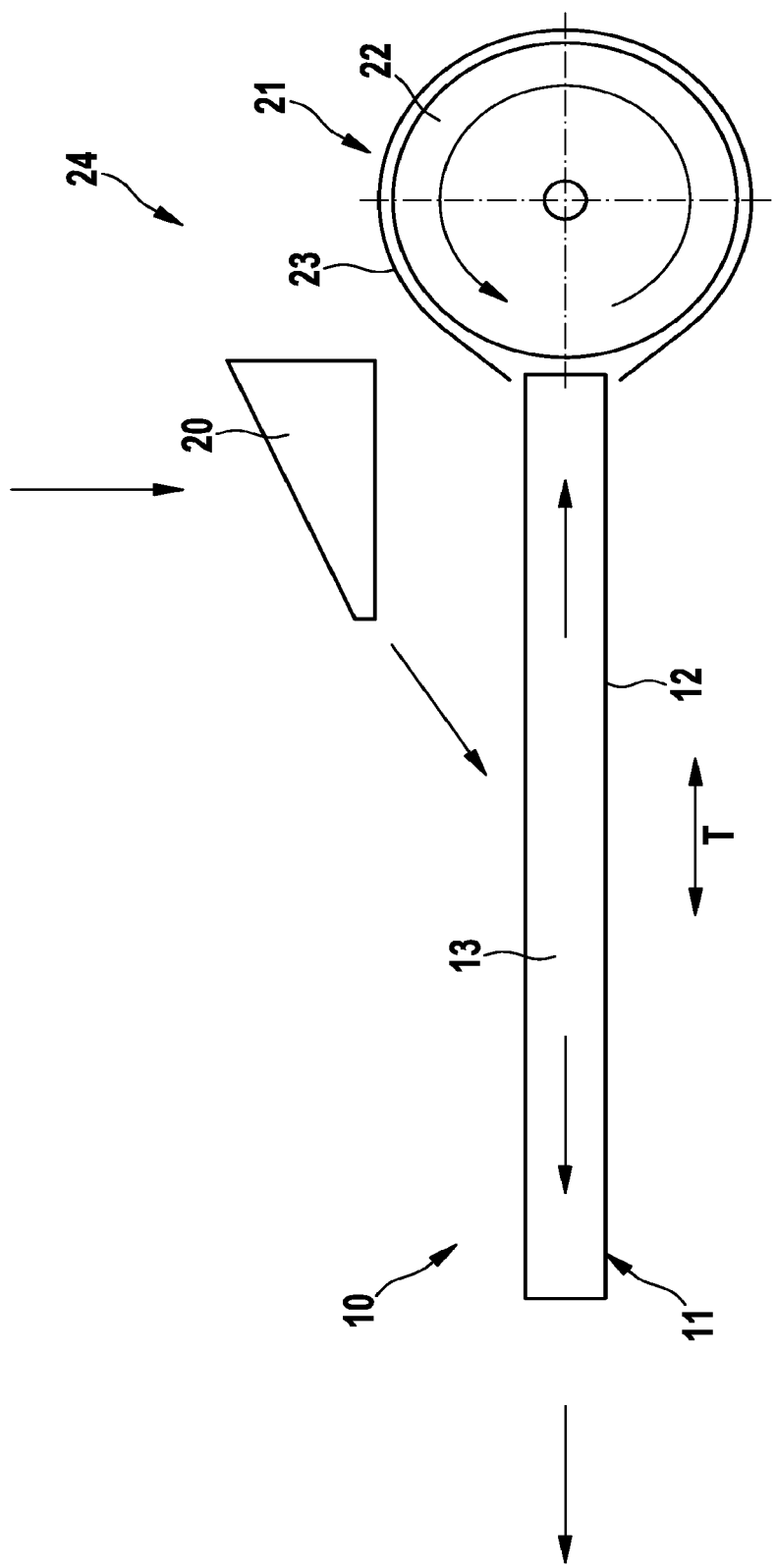
FIG. 1 a schematic side view of a device for aligning fish in a head/tail orientation with a fish transporting apparatus, FIG. 2a a front view of the fish transporting apparatus with a U-shaped channel and inserted grid plate, FIG. 2b a side view of the fish transporting apparatus according to FIG. 2a, FIG. 3a a front view of the fish transporting apparatus, in which the U-shaped channel is composed of the grid plate and lateral boundary elements and beneath the channel is arranged a guide element, FIG. 3b a side view of the fish transporting apparatus according to FIG. 3a, FIG. 4 a top view of the grid plate, FIG. 5 an enlarged view of detail V according to FIG. 4, and FIG. 6 a top view of a further embodiment of the grid plate.

The grid plates and fish transporting apparatuses shown in the drawings can be used as a conversion kit for existing vibrating conveyors or the like and also as an independent fish transporting apparatus for automatically feeding fish and/or for sorting them in a head/tail orientation.

In FIGS. 1 to 6 are shown different variants of fish transporting apparatuses 10 for automatically feeding fish to a subsequent fish processing machine (not shown). Each fish transporting apparatus 10 comprises a transport device 11 with a bottom element 12 and lateral boundary elements 13 which are also referred to as side elements. The bottom element 12 serves to receive and convey the fish. The lateral boundary elements 13 keep the fish on the bottom element 12 or guide the fish in the direction of transport T. Furthermore, associated with the transport device 11 is a vibrating member which causes the transport device 11 to vibrate. The vibrating member is a drive which is usual for such purposes, so that a drawing and a detailed description are dispensed with.

The bottom element 12 according to the invention is constructed as a grid plate. For this purpose the bottom element 12 has several rectangular apertures 14. Basically the number of apertures 14 and their distribution are as desired. Preferably, and as shown in FIGS. 4, 5 and 6, the apertures 14 are arranged in such a way that two opposed edges 15 are arranged in the direction of transport T of the fish and two further edges 16 are arranged at a right angle to the direction of transport T. Preferably, the edges 15 of the apertures 14 directed in the direction of transport T of the fish are shorter than the edges 16 of the apertures 14 which are directed at a right angle to the direction of transport T. But the apertures 14 can also be square or have an edge length ratio other than the one described.

Between adjacent apertures 14 in each case are formed webs 17. The webs 17 are narrower than the apertures 14 in their width transverse to the direction of transport T. In other words, the width of the webs 17 is smaller than the width of the apertures 14. As mentioned, the apertures 14 can be distributed as desired. Preferably, however, the apertures 14 are arranged in a uniform pattern in the bottom element 12. For this purpose several apertures 14 lie in a row adjacent to each other transversely to the direction of transport T. The apertures 14 in one row have substantially the same shape and size. Only in the edge regions can the apertures 14 differ in shape and size. The apertures 14 are staggered from each other from one row to the next, namely alternating, as it were. To put it another way, the apertures 14 of one row are each staggered from the apertures 14 of the rows that are adjacent in the direction of transport T, to increase the chance of fins entering/catching in the apertures 14.

As mentioned, the grid element can serve as an independent fish transporting apparatus 10. Then the lateral boundary elements 13 (as e.g. in FIG. 3) and the vibrating member are directly associated with the grid element. Optionally a guide element 18 is associated with the bottom element 12 or grid plate for receiving and carrying away the fluid and/or solid constituents which drop, flow or otherwise pass from above through the apertures 14 in the grid plate. Preferably, however, the grid plate is constructed as a conversion kit for existing channels 19 composed of the guide element 18 and the lateral boundary elements 13. The grid plate is then loosely inserted in the channel 19 or permanently but releasably connected to the guide element 18 or channel 19. In this case the vibrating member is preferably associated with the channel. The bottom element 12 or the grid plate can, as shown in FIG. 6, optionally be bevelled at one end. This sloping surface can serve e.g. to feed the fish in a directed manner to a single-stroke device or other subsequent components. The shape and size of the apertures 14 can be accordingly matched to this sloping section of the bottom element 12.

Preferably, the grid plate is horizontally oriented. But optionally the grid plate can have a slight inclination of a few degrees to the horizontal plane. The guide element 18 can be arranged and oriented parallel and non-parallel and at a distance from the grid plate. Preferably, the guide element 18 is however arranged at an angle equal to 0° to the orientation of the grid plate, as shown in FIG. 2. A further embodiment provides making the inclination of the guide element 18 to the grid plate and/or to the horizontal plane or the unit consisting of channel 19 and grid plate adjustable. The distance between the grid plate and the guide element 18 is also variable and adjustable. In particular for cleaning purposes a pivotable or otherwise displaceable design of the channel 19 or a pivotable arrangement between guide element 18 and grid plate can be provided. Preferably, the distance between the grid plate and the guide element 18 is between 5 mm and 20 mm and preferably between 7 mm and 16 mm and particularly preferably approximately 10 mm.

The bottom element 12 or the grid plate is preferably made of special steel. Construction from plastic or other corrosion-resistant materials or combinations of materials is possible as well. The same also applies to the guide element 18 and/or the lateral boundary elements 13. Associated with the vibrating member or the associated drive is a control system by means of which the speed of transport, namely in particular the frequency, is adjustable. A preferred frequency is within the range from 250 to 350 double strokes per minute. Naturally the frequency can also be outside this range. With the variation or adaptation of frequency, the fish transporting apparatus 10 can be adapted for the transport of fish with different qualities and sizes.

Automatic feeding and/or sorting of the fish is effected as mentioned below. The fish are guided directly or via a feed element 20, for example a chute or the like, onto the bottom plate 12, wherein the fish land on the bottom element 12 in a disorderly fashion with respect to head/tail orientation. At one end of the fish transporting apparatus 10 is arranged a fish processing machine (not shown). At the opposite end of the fish transporting apparatus 10 is arranged a device 21 for turning the fish in a head/tail orientation. Due to the oscillating or vibrating drive of the bottom element 12, the fish are transported headfirst in their preferred transport movement. For this purpose the fish catch with their fins in the apertures 14 and are repelled by the vibrating movement. To put it another way, the edges 15, 16, in particular the edges 16 running transversely to the direction of transport T, give the fish a driving impulse which moves the fish forwards headfirst. The fish of which the heads point in the direction of the fish processing machine are processed directly after reaching the fish processing machine. The fish which are transported away from the fish processing machine move in the direction of the turning device 21. This device 21 turns the fish through 180° in such a way that, after leaving the device 21, the fish point headfirst on the bottom element 12 in the direction of fish processing machine. In this turning device 21 a rotating element 22, for example a roller, brush or the like, transports the fish. On the outside the rotating element 22 is bounded by a guide plate 23 or the like to form a channel. Then the fish which have been corrected in position are fed to the fish processing machine in the manner already described. The frequency of the oscillating or vibrating movement is adjusted dependent on the quality and size (weight) of the fish. The fish transporting apparatus 10 forms, together with the turning device 21, a device 24 for aligning fish in a head/tail orientation.

We claim:

1. A fish transporting apparatus for automatically feeding fish to a fish processing machine, comprising:
    a transport device with a bottom element for receiving the fish;
    lateral boundary elements for guiding the fish; and
    a vibrating member for vibratory driving of the transport device, wherein vibration of the vibrating member causes the fish to move in a first direction when the fish is in a first orientation and a second direction when the fish is in a second orientation, wherein the first direction is opposite to the second direction,
    wherein the bottom element is constructed as a grid plate with rectangular apertures.

2. The apparatus according to claim 1, wherein the rectangular apertures are arranged with their edges in a direction of transport of the fish and at a right angle to the direction of transport.

3. The apparatus according to claim 2, wherein the edges of the apertures which point in the direction of transport of the fish are shorter than the edges of the apertures which are directed at a right angle to the direction of transport.

4. The apparatus according to claim 2, further comprising webs between adjacent apertures that are narrower than the apertures in their width transversely to the direction of transport.

5. The apparatus according claim 1, wherein the apertures are arranged in a uniform pattern in the bottom element.

6. The apparatus according to claim 1, wherein the apertures lie in rows adjacent to each other transversely to the direction of transport.

7. The apparatus according to claim 6, wherein the apertures of each row are staggered from apertures of adjacent rows in the direction of transport.

8. The apparatus according to claim 1, further comprising a guide element beneath the grid plate for receiving and carrying away fluid or solid constituents which fall through the apertures of the grid plate.

9. The apparatus according to claim 8, wherein the guide element with the lateral boundary elements forms a U-shaped channel.

10. The apparatus according to claim 9, wherein the grid plate is inserted in the U-shaped channel.

11. The apparatus according to claim 8, wherein the grid plate is arranged parallel to the guide element.

12. The apparatus according to claim 9, wherein the vibrating member is associated with the U shaped channel.

13. The apparatus according to claim 8, wherein a distance between the grid plate and the guide element or an angle between the grid plate and the guide element is adjustable.

14. The apparatus according to claim 8, wherein a distance between the grid plate and the guide element is between 5 mm and 20 mm.

15. The apparatus according claim 1, wherein at least the grid plate is made of steel.

16. A device for aligning fish having a head and tail in a head/tail orientation, comprising:
    a fish transporting apparatus; and
    a device arranged at one end of the fish transporting apparatus for turning the fish with respect to their position of head/tail orientation, wherein the device is adapted to turn the head and tail portions of the fish,
    wherein the fish transporting apparatus comprises:
        a transport device with a bottom element for receiving the fish;
        lateral boundary elements for guiding the fish; and
        a vibrating member for vibratory driving of the transport device, wherein vibration of the vibrating member causes the fish in a first orientation to move away from the fish processing machine and towards the device and causes fish in the second orientation to move away from the device and toward the fish processing machine,
    wherein the bottom element is constructed as a grid plate with rectangular apertures.

* * * * *